Sept. 21, 1965 W. H. BAILEY 3,206,961

STRIP TENSIONING DEVICE

Filed Dec. 1, 1960 8 Sheets-Sheet 1

Sept. 21, 1965 W. H. BAILEY 3,206,961

STRIP TENSIONING DEVICE

Filed Dec. 1, 1960 8 Sheets-Sheet 2

Sept. 21, 1965 W. H. BAILEY 3,206,961

STRIP TENSIONING DEVICE

Filed Dec. 1, 1960 8 Sheets-Sheet 4

STRIP TENSIONING DEVICE

Filed Dec. 1, 1960

STRIP TENSIONING DEVICE

Filed Dec. 1, 1960 8 Sheets-Sheet 6

Sept. 21, 1965 W. H. BAILEY 3,206,961

STRIP TENSIONING DEVICE

Filed Dec. 1, 1960 8 Sheets-Sheet 7

Sept. 21, 1965 W. H. BAILEY 3,206,961

STRIP TENSIONING DEVICE

Filed Dec. 1, 1960 8 Sheets-Sheet 8

3,206,961
STRIP TENSIONING DEVICE
William Heap Bailey, Sheffield, England, assignor to Davy and United Engineering Company Limited, Sheffield, England
Filed Dec. 1, 1960, Ser. No. 73,162
Claims priority, application Great Britain, Dec. 3, 1959, 41,103/59
13 Claims. (Cl. 72—18)

This invention relates to the control of tension, particularly of moving strip or web, and is concerned more particularly with so-called loopers and methods of controlling same.

By the term looper is meant a mechanism which may be disposed between successive pairs of rolls of a multi-stand strip rolling mill, for example, to engage said strip and indicate or effect tension variations and adjustments in the strip.

In one aspect the present invention provides a looper comprising a device adapted to engage elongate material moving under tension, a transmission member coupled to the device and adapted to transmit force to the device to vary the path of said material, the ratio of the tension in said material to the force applied by the transmission member varying with the position of the device and hence of the transmission member, and a force producer tending to move the transmission member through a force converter, which force converter is such that the ratio of the force supplied by the force producer to the force in the transmission member has substantially the same relationship to the position of the transmission member as the ratio of the tension in the material to the force in the transmission member.

In another aspect the invention provides a control system for controlling the tension in moving elongate material comprising means for controlling said force producer to produce a predetermined force.

The invention will be more readily understood by way of example from the following description of different embodiments in accordance therewith, reference being made to the accompanying drawings, in which:

FIGURES 7, 8 and 9 illustrate diagrammatically the operation of the looper of FIGURE 6 with different operational settings;

Figures 1, 3, 4:
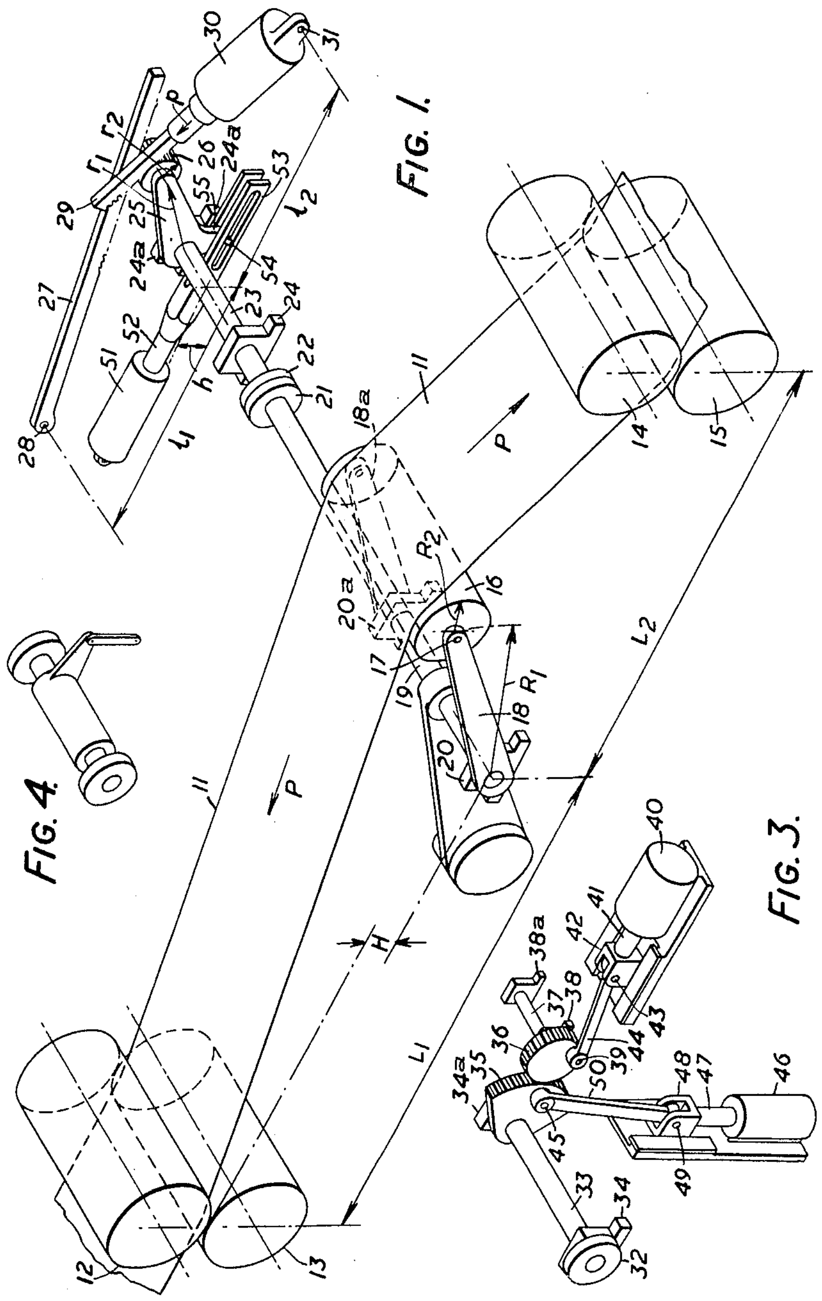
FIGURE 1 is a perspective view of one form of looper.
FIGURE 3 is a perspective view of part of a second form of looper.
FIGURE 4 illustrates a torque meter for association with the looper of FIGURE 1 or 3.

In FIGURE 1, 11 is a strip of metal or other material passing between pairs of rollers 12, 13 and 14, 15. A looper roller 16 revolving freely on a spindle 17 acts on the strip in such a way as to deflect it from a direct path between the pairs of rollers and under this condition the tension in the strip is related to the force with which the roller presses upon the strip. The spindle 17 of the roller is carried by arms 18 and 18a fastened to a weigh-shaft 19 supported by, and free to rotate in bearings 20 and 20a. This arrangement so far described is in general use in rolling mills and elsewhere.

Figures 2, 6:
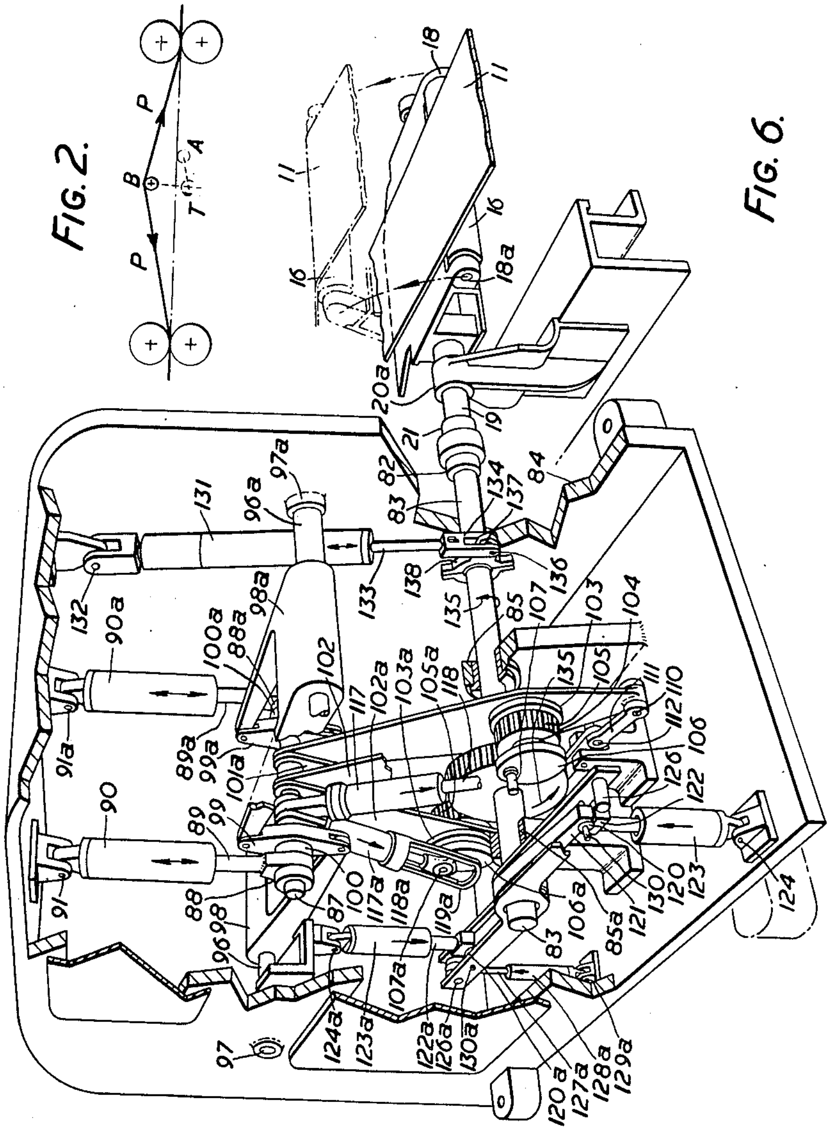
FIGURE 2 shows the looper of FIGURE 1 in its two extreme positions.
FIGURE 6 is a perspective view of a further form of looper.

If the system is assumed to be frictionless and the masses to be balanced, the ratio of strip tension (P) to torque (T) in the shaft 19, is infinite when the roller is in contact with, but does not deflect, the strip, as illustrated at A in FIGURE 2. It is also infinite when the plane containing the axes of the roller and the weigh-shaft is equally inclined to the strip approaching the roller and the strip which has left the roller, as illustrated at B in FIGURE 2. The ratio diminishes to a minimum value about half way between them. The devices shown in FIGURES 1, 3, 6, 11 and 12 are designed to regulate the torque in accordance with the elevation of the roller 16 so that the tension P remains substantially constant at any desired value and is not affected by change in elevation.

Reverting to FIGURE 1, the weigh-shaft 19 has a half-coupling 21 at one end which engages with half-coupling 22 at one end of a shaft 23, carried in bearings 24 and 24a. Shaft 23 has fixed to it a crank 25 carrying at its outer end a crank-pin upon which revolves freely a pinion 26. A rack 27 is pivoted at 28 to a fixed foundation and its teeth engage with those of the pinion 26. A rack 29, which also engages with the pinion 26, is rigidly attached to the ram of a hydraulic or pneumatic cylinder 30, or other actuator, pivoted to a fixed foundation at 31. The indicated dimensions and dispositions of the parts 23 to 31 are in a fixed ratio to those of the corresponding parts 12 to 20, i.e., $$l_1/L_1=l_2/L_2=h/H=r_1/R_1=r_2/R_2=\text{a constant } C$$

With this relationship and assuming the masses are balanced and effect of friction is neglected, the tension force in the strip is C times the thrust exerted by the hydraulic cylinder 30. If, therefore, the thrust of cylinder 30 is constant, the tension in the strip 11 is automatically maintained constant.

FIGURE 3 shows a mechanism which will give approximately constant tension in the strip 11. Half-coupling 32 is provided to connect a shaft 33 to the weigh-shaft 19 in place of half-coupling 22 (FIGURE 1). Shaft 33 is carried in bearings 34 and 34a and has attached to it a toothed quadrant 35 which meshes with a toothed wheel 36, which is mounted on a shaft 37 carried in bearings 38 and 38a. Toothed wheel 36 carries a crank-pin 39, to which force can be applied by the hydraulic or pneumatic cylinder 40 through ram 41, crosshead 42, gudgeon pin 43 and connecting rod 44. The ratio of the pitch circle radius of the quadrant 35 to that of the wheel 36 in the arrangement of FIGURE 3 is 2:1, but may differ from this value if required. For a constant thrust of the ram 41, the turning moment applied to the wheel 36 therefore varies from zero at inner dead centre to zero at outer dead centre, passing through a maximum about midway between these positions. The proportions and dispositions of the parts are chosen in relation to those of parts 12 to 20 (FIGURE 1) so as to match closely the torque produced in weigh-shaft 19 by a constant strip tension with the torque in shaft 33 by a constant pressure in cylinder 40.

To the torque resulting from strip tension there is added a torque due to the strip's weight. The weight is approximately constant for any given width and thickness of the strip and the resulting torque is proportioned to the cosine of the angle which the arms 18 and 18a (FIGURE 1) make with the horizontal. To balance this torque, the quadrant 35 in FIGURE 3 is provided with a crank-pin 45 to which a thrust is applied by a hydraulic cylinder 46 through ram 47, crosshead 48, gudgeon pin 49 and connecting rod 50.

It is intended that the roller 16 shall be kept in its lowest position when there is no strip between either rolls 12 and 13 or between rolls 14 and 15 and that it shall be raised to a working position only when the strip is in both pairs of rolls. As the cylinder 30 or 40 can produce little or no torque when the roller is down, additional means are provided to raise the roller. In the mechanism shown in FIGURE 1, raising is carried out by applying hydraulic pressure to an additional cylinder and piston 51, the piston rod 52 of which carries a slotted extension 53 which engages with a pin 54 in an arm 55. The provision of the slotted extension 53 for engagement with pin 54 enables the piston rod 52 to be retracted after the roller 16 has been raised, and the roller can then rise or fall without movement of the piston rod 52. By making this cylinder double acting it can also be used to restore the roller to its lowest position when the back end of the strip leaves the rolls 12 and 13. It may further be used to balance the weight of the strip as is done by the cylinder 46 (FIGURE 3). When the mechanism illustrated in FIGURE 3 is used, raising of the roller and return of it to its bottom position can be carried out by modulating the pressure in cylinder 46, or a separate cylinder and piston for this purpose can be added.

In FIGURE 3, the crank-pins 39 and 45 are shown as having fixed throws, strip tension being determined by the pressure applied to cylinder 40 and the compensation for its weight by the pressure applied to cylinder 46, means being provided for changing these at will. Alternatively, fixed pressure may be used and the throws made variable.

FIGURE 4 represents a torque and rotation meter which can be interposed between the weight shaft 19 and the shaft 23 or 33 of the drive unit to give a more accurate indication of tension than is given by the hydraulic pressure in the operating cylinders. The signal, which is derived from both the torque in the shaft and the position of the looping roller, is related to a combination of tension and strip weight. The tension component is zero when the roller is in position A (FIGURE 2) and the signal may be used under this condition as a measure of the weight of the strip, from which any necessary adjustment to weight balancing systems can be made either by operating manually or automatically a control for the pressure in cylinder 46 or 51. Weight can also be derived automatically from the screwdown setting, the roll force of rolls 12 and 13 and the setting of the side guides.

Figure 5:
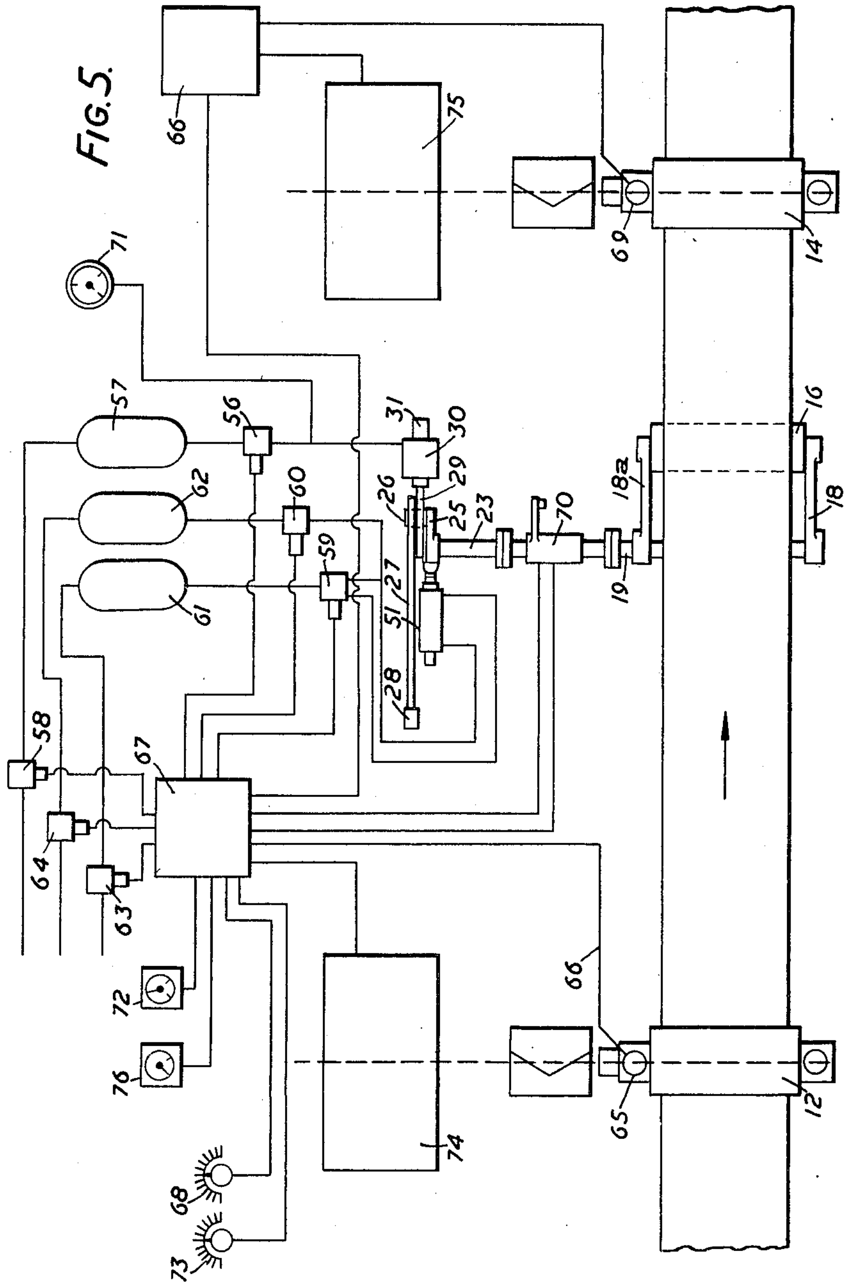
FIGURE 5 illustrates a control system incorporating the looper of FIGURE 1.

FIGURE 5 shows, schematically, a control system for a looper as described above, and illustrates particular application to the looper of FIGURE 1, although with slight modification it can be used in connection with the other disclosed embodiments of the present invention. Cylinder 30 is connected through a valve 56 to a hydraulic accumulator 57 which is shown as one of the gas-loaded type. The gas supply to it is controlled by the valve 58. The left hand end of the cylinder 51 is connected through valves 59 and 60 to accumulators 61 and 62, the gas supplies to which are controlled by valves 63 and 64.

When no strip is between the pairs of rolls 12 and 13 and 14 and 15 the looping roller is in the down position with pressure admitted only to the right hand end of the cylinder 51 to hold it so. The passing of a front end of a strip between the rolls 12 and 13 causes an increase in roll force which is signalled by a roll force meter 65 and electrical circuits 66 and 67 to valves 56 and 58 by which the pressure corresponding to the tension required is admitted to the cylinder 30. The piston cannot raise the roller as the piston thrust and the thrust in the rack 27 are equal and opposed to one another in the same horizontal plane. The pressure is set by the operator's control 68.

When the front end passes between the rolls 14 and 15 a signal is obtained from a second load cell 69 and associated electrical circuits. This causes a torque meter 70, similar to that of FIGURE 4, to be effective to give a signal representing the weight of the strip, and the pressure which will be required to balance this weight signal is applied to valve 64 to establish such pressure in accumulator 62. Valves 60 and 59 are then operated to release the pressure from the right hand end of the cylinder 51, apply pressure from accumulator 61 to the left hand end of cylinder 51 until the roller is carried to a working position and then transfer connection of this end of the cylinder from accumulator 61 to 62 for strip weight balance. The roller then floats up and down as the length of strip between the two pairs of rolls varies with the strip tension maintained substantially constant by the action of cylinder 30. The tension is indicated by the pressure gauge 71 or the indicator 72 operated from the torque meter 70.

In practice strip passing through a multi-stand mill assumes a tension which is commonly referred to as the thread tension and is dependent on the mill setting. A looper according to the invention will, as described, adjust the path of the strip and so change strip tension to a value corresponding to the cylinder pressure. However, unless some change is made to the mill setting, the strip will necessarily tend to assume its initial thread tension, and the adjustment of strip path by the looper will only maintain tension at the required value within the looper operating range. Thus the looper arm will rise or fall as the strip tends to assume a thread tension value which is respectively lower or higher than the required value to which the looper operates.

The action of a looper, therefore, is to provide a controlled tension store into which strip issuing from the rolls 12 and 13 is received and from which it is supplied to the rolls 14 and 15. It has only a limited capacity and tension will be lost when it is full or rise to a high value when it is exhausted. Clearly, if constant tension is to be maintained, movement of the roller from the means working position chosen for it must be followed or accompanied by adjustment of the mill setting and such adjustment should be effected before the capacity of the looper terminates. The mill setting may be varied by adjustment of the relative speeds and torques of motors 74 and 75 driving the rolls to move it back again.

This adjustment may be carried out by the operator, guided by the indicator 76 which shows the position of the roller, or may be carried out automatically.

As mentioned earlier meter 70 is similar to that of FIGURE 4 which, although used in one sense as a torque meter to indicate strip weight, is also responsive to the position of the looper roll, that is the angular position of the looper roll arms. Indicator 76 is responsive to this signal which is directed via electrical circuit 67 and this indicator, or in fact visual inspection of the looper arm position per se, can be employed by an operator as a basis for controlling the strip speed between roll pairs 12, 13 and 14, 15 to maintain the strip tension with the range of control of looper arm. Thus, if the looper arm tends to, or reaches, its upper limit this indicates that the mill setting is such as to produce a strip thread tension which is less than the required strip tension, although the latter is maintained substantially constant at the required value within the range of looper arm control. The strip tension will tend to decrease to this lower value thread tension once the looper arm reaches the upper limit. This is remedied by increasing the speed of rolls 14, 15 and/or decreasing the speed of rolls 12, 13. Conditions are thus set to give rise to an increased thread tension and the strip may so be maintained within the operating range of the looper to maintain the desired tension and so indicate the necessity for further adjustment to the mill setting.

Similarly, if the looper arm tends to or reaches its lower limit the mill is adjusted for lower thread tension in appropriate manner to maintain the looper arm control effective, so that in actuality tension is maintained constant.

In the case of automatic control the looper arm position signal derived from the meter 70 may be employed by electrical circuit 67 as a position error signal indicating divergence of the looper arm from the predetermined mean working position. This signal may then be applied to automatically control one or other, or both, or the roll drive motors 74 and 75 to adjust the roll speeds to maintain the strip tension control within the operative range of the looper arm. Although ideally the looper arm is maintained at its predetermined mean working position by such control and in theory the tension would be maintained constant in any event without the looper mechanism of the present invention in practice, the looper mechanism forms a temporary storage of limited capacity which maintains the strip tension substantially constant while any necessary but slower adjustment of strip speed is effected to tend to maintain the looper arm at its mean working position.

FIGURE 6 illustrates a further looper mechanism which is derived as a modification of the arrangement of FIGURE 3. Some elements of FIGURE 6 are similar to corresponding elements in FIGURE 3 and the same reference numerals are employed where this is the case.

Thus, referring to FIGURE 6, the strip 11 of metal is to be tensioned by the looper roller 16 which is pivoted to similar arms 18 and **18*a*. The arms 18 and 18*a* rotate with a weigh-shaft 19 mounted in bearings of which one is shown at 20*a*, the shaft 19 terminating in a half-coupling 21**.

A shaft 83 co-axial with the shaft 19 is connected thereto by a half-coupling 82, the shaft 83 being mounted in bearings 85 and **85*a* attached to the floor of a casing 84. Within the casing 84, the shaft 83 carries a toothed wheel 86**.

A second shaft 87 is suspended within the casing 84, parallel with the shaft 83, by means of bearings 88 and **88*a* respectively formed upon the lower ends of rams 89 and 89*a* of hydraulic or pneumatic cylinders 90 and 90*a*, these cylinders being respectively pivoted at 91 and 91*a* to the top wall of the casing 84**.

The shaft 87 is also connected by linkages to two parallel shafts 96 and **96*a* each of which is mounted in bearings formed in the casing 84. Two of these bearings are shown at 97 and 97*a***.

Respectively mounted upon the shafts 96 and **96*a* are two bifurcated members 98 and 98*a*. Corresponding extremities of the arms of these members are pivotally connected to opposite ends of links 99 and 99*a*, these links respectively carrying central bearings 100 and 100*a* through which the shaft 87** passes.

Two lever arms 101 and **101*a* are each pivoted at their upper ends about the shaft 87, as are two further similar lever arms 102 and 102*a*. Each of the arms 101, 101*a*, 102 and 102*a* carries, at a position intermediate of its length, a bearing of which one is shown at 103 and one at 103*a*. Corresponding pairs of these bearings each carry a shaft parallel to the shaft 87, one of these shafts being shown at 104. The shaft 104 carries, so as to rotate with the shaft, a toothed wheel 105 and a disc member 106. Similarly, the other shaft (not shown) carries a tooth wheel 105*a* and a disc member 106*a*. The member 106 is provided with a pivot pin 107, and the member 106*a* is similarly provided with a pivot pin 107*a*. The toothed wheels 105 and 105*a* engage with the toothed wheel 86** respectively at opposite sides thereof.

The lower end of the lever arm 101 is pivoted at 110 to one end of a link 111 the other end of which is pivoted at 112 to a member secured to the bottom wall of the casing 84, and similar arrangements (not shown) are provided for the lever arms **101*a*, 102 and 102*a***.

Two hydraulic or pneumatic cylinders 117 and **117*a* are pivoted about the shaft 87, and the rams 118 and 118*a* of these cylinders are pivoted at their lower ends about the pivot pins 107 and 107*a* respectively, the rams being provided with cross-heads arranged to slide within guides of which one is shown at 119*a***.

A lever arm 121 is symmetrically mounted upon the shaft 83, and is keyed to the shaft 83 for rotation therewith. Opposite ends of the arm 121 can be respectively acted upon by the rams 122 and **122*a*, of single-acting hydraulic or pneumatic cylinders 123 and 123*a* which are respectively pivoted to the casing 84 at 124 and 124*a*, by way of journal members 120 and 120*a* respectively which are provided between the ends of the rams 122 and 122*a* and the arm 121** and which are independently supported in a manner to be described.

Two lever arms 125 are mounted at opposite sides of the lever arm 121 and are free to revolve about the shaft 83. Opposite ends of the lever arms 125 are respectively pivotally connected at 126 and **126*a* to the rams of two oppositely acting single-acting hydraulic or pneumatic cylinders; one of these rams is shown at 127*a* and the corresponding cylinder 128*a* is pivoted at 129*a* to the casing 84. The other cylinder (not shown) is pivoted to the casing 84 in a manner similar to that in which the cylinder 123*a* is pivoted at 124*a* to the casing 84. Pivot pins 130 and 130*a* pass through the lever arm 125 and the journal members 120 and 120*a*** respectively.

Comparison of FIGURE 6 with FIGURE 3 will show that the mechanism of the two figures are essentially similar. Thus, the toothed quadrant 35, toothed wheel 36 and cylinder 40 of that FIGURE 3 are respectively equivalent to the toothed wheel 86, the toothed wheel 105 together with the disc member 106, and the cylinder 117 of FIGURE 6. In FIGURE 6, however, the arrangement is duplicated, the toothed wheel 86 also co-operating with the toothed wheel **105*a* together with the disc member 106*a* and the cylinder 117*a***. The operation of the arrangement of FIGURE 6 is similar to the operation of the arrangement of FIGURE 3 and is illustrated by FIGURES 7, 8, 9 and 10.

In FIGURE 6, the looper roller 16 is shown in its horizontal position; the toothed wheels 105 and **105*a* are symmetrically disposed at opposite sides of the toothed wheel 86, and the pivot pins 107 and 107*a* are symmetrically disposed at opposite sides of the shaft 83 since the cylinders 117 and 117*a* are equally inclined to a vertical plane passing through the axis of the shaft 87. It will be clear that under these conditions no net torque will be exerted upon the shaft 83 by the cylinders 117 and 117*a***, as may be seen from an inspection of FIGURE 8 which schematically shows this arrangement at (*a*), it being assumed that equal thrusts F are exerted by each of the cylinders 117 and **117*a*. As described above it is a necessary condition for the operation of the tension control device, that this net torque shall be zero when the looper roller 16** is horizontal, and the arrangement shown in FIGURES 6 and 8 thus satisfies this condition.

Figures 8A, 8B, 8C, 8D:
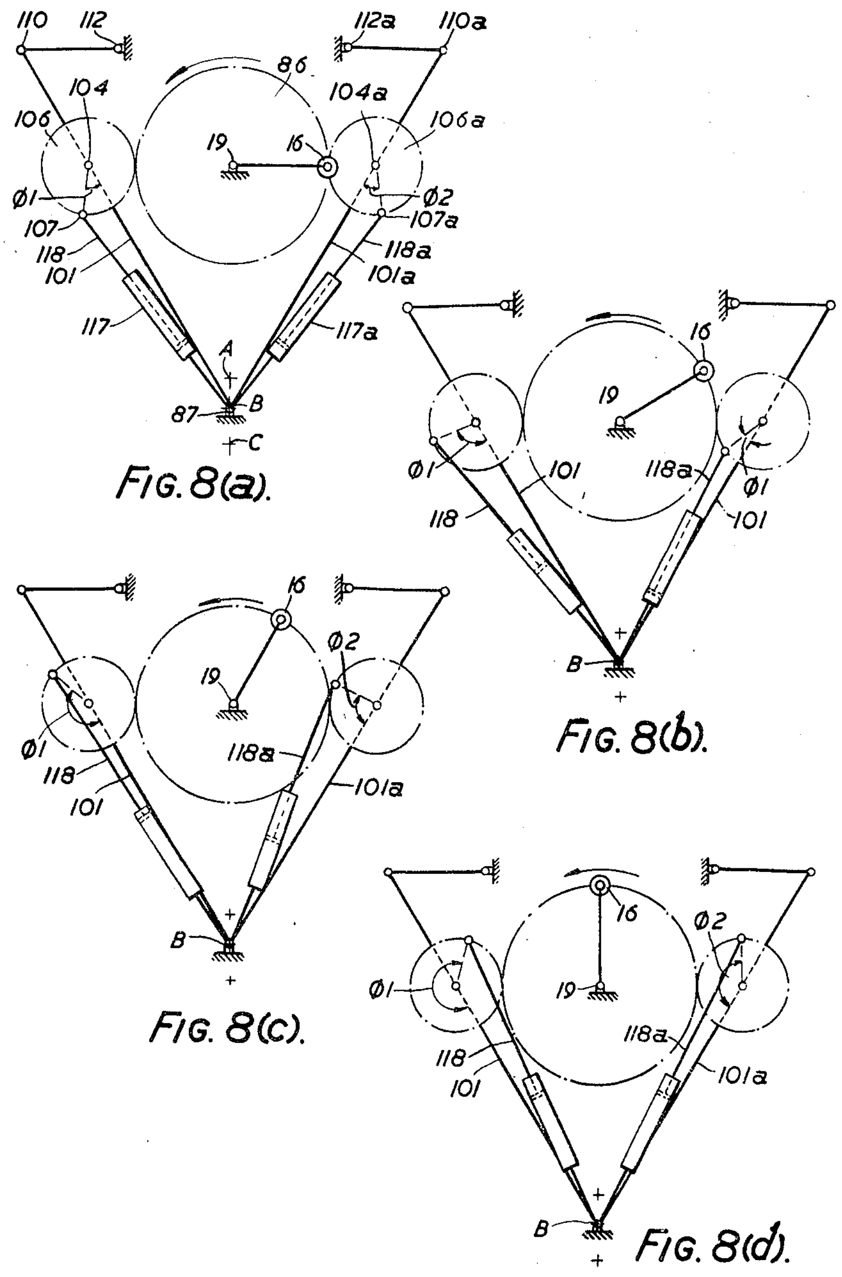

The cylinders 123 and **123*a* their rams 122 and 122*a*, the journal members 120 and 120*a*, and the arm 121 are employed to commence the raising of the looper roller 16 from the horizontal position, by applying a torque to the shaft 83** to disturb the arrangement of FIGURE 6 from the stable position in which it is shown in FIGURE 8(*a*), by rotating the shaft 83 through a small angle and in an anti-clockwise direction, as shown by the arrow 135. The two rams of which one is shown at **127*a* are employed thereafter to push the rams 122 and 122*a* back into their cylinders, and act through the arms 125, the pins 130 and 130*a*, and the journal members 120 and 120*a*. When disturbance by the starting system has occurred, the angular inclinations of the cylinders 117 and 117*a* to the vertical plane passing through the axis of the shaft 87 will be unequal and will depend upon the height to which the strip 11 permits the roller 16 to rise under the existing torque in the shafts 83 and 19**. FIGURE 8(*b*) illustrates such an arrangement; it will be seen that since the couples exerted by the equal thrusts F of the cylinders 117 and **117*a*, about the axes 104 and 104*a*** of the toothed wheels 105 and 105$a$, are no longer equal and opposite, a net torque is exerted upon the shaft 83 through these toothed wheels and the toothed wheel 86. For a different elevation of the roller 16 the disposition of the arrangement may be as shown in FIGURE 8($c$).

When the roller is elevated through an angle of 90° to the horizontal, the arrangement of FIGURE 6 attains a second stable position, as shown in FIGURE 8($d$) and as described above. In order to disturb this second stable state, pressure is applied to a double-acting hydraulic or pneumatic cylinder 131 which is pivoted to the casing 84 at 132 and the ram 133 of which carries at its lower end a fork 134 which carries a pin 136. This pin passes through a slot 137 in a lever arm 138 keyed to the shaft 83. The slot is of such length and is so placed in the lever arm that when a downward thrust is exerted by the cylinder 131 the line of action of that thrust will not pass through the axis of the shaft 83 and a couple acting to rotate the shaft 83 clockwise so as to bring the roller to its horizontal position will be produced.

As mentioned earlier, to the torque resulting from strip tension there is added a torque due to the weight of the strip 11. The latter torque can be balanced by applying suitable pressure to the underside of the piston in the cylinder 131, so that the ram 133 will pull upwards upon the lever arm 138. The pin 136 will engage the upper end of the slot 137 which is so placed that the line of action of the tension in the ram 133 will pass through the centre of the shaft 83, and so produce no torque therein, when the roller is elevated through 90° so that no torque is produced by the weight of the strip.

Figures 9A, 9B, 9C, 9D, 10:
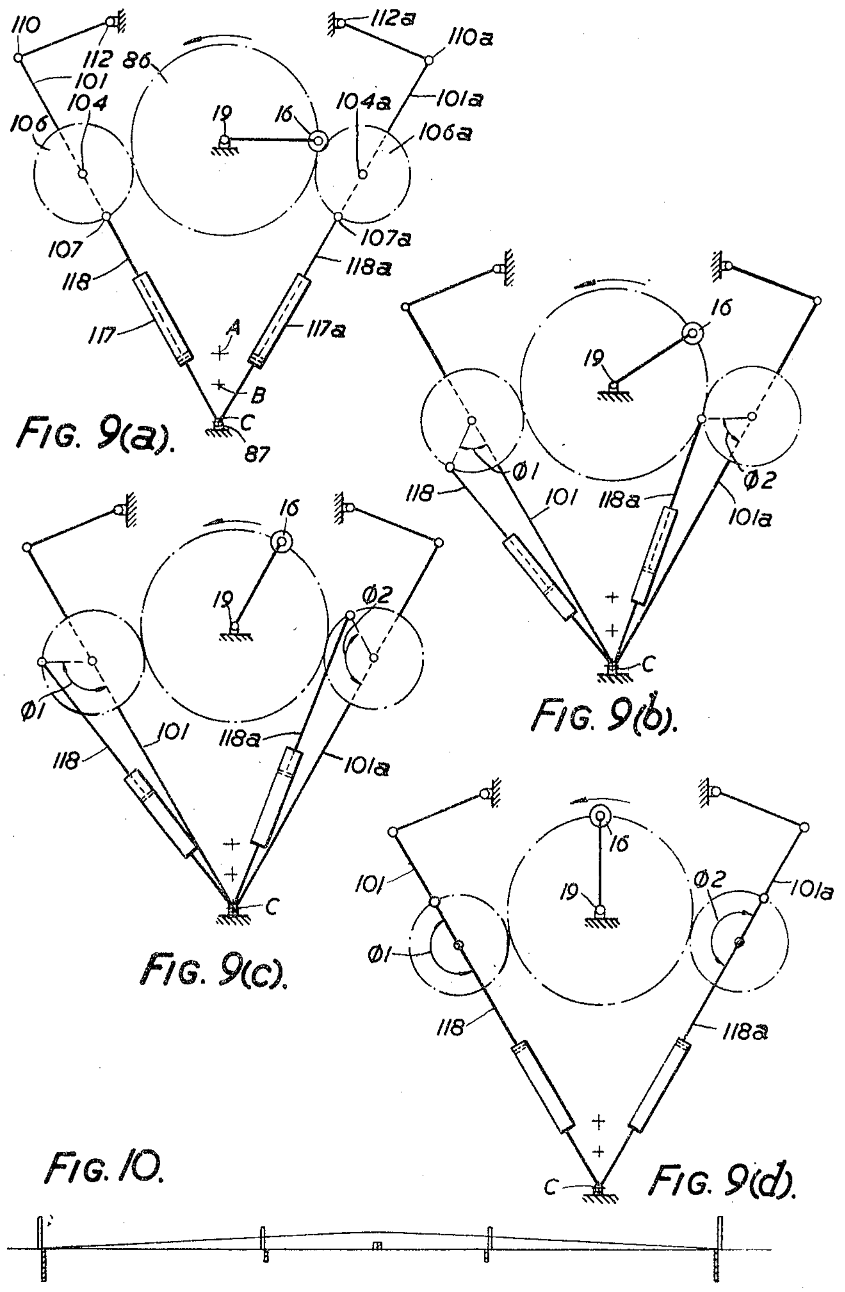
FIGURE 10 illustrates the effect of the force converter arrangement of the looper of FIGURE 6 with the operational setting associated with FIGURE 8.

FIGURE 10 shows the variation of net torque applied to the shaft 83, as the angular dispositions of the cylinders 117 and 117$a$ are altered, as described with reference to FIGURE 8, for example. The individual torque contributions from the cylinders 117 and 117$a$ are indicated for the specific dispositions of FIGURE 8 and the respective contributions are differentiated by cross-hatching for the right hand cylinder. The torque contributions above and below the horizontal axis of FIGURE 10 are of opposite effect on the looper arm.

It will be seen that the net torque is zero for the symmetrical dispositions of FIGURES 8($a$) and 8($d$), and is a maximum for a disposition intermediate those of FIGURES 8($b$) and 8($c$), the latter net torque being the result of substantially equal, additive torque contributions from both cylinders.

The magnitude of this maximum torque is dependent upon the angular inclination of the cylinder 117 and ram 118 to the lever arm 101 in the symmetrical disposition, and this is indicated by the angle $\theta$, between the radius of wheel 106 passing through pivot pin 107 and the lever arm 101 in such position. In this symmetrical disposition, the corresponding angle $\theta_2$ associated with wheel 106$a$ and lever arm 101$a$ will be equal to $\theta_1$ and in the case of FIGURE 8, $\theta_1=39°=\theta_2$.

Figures 7A, 7B, 7C, 7D:
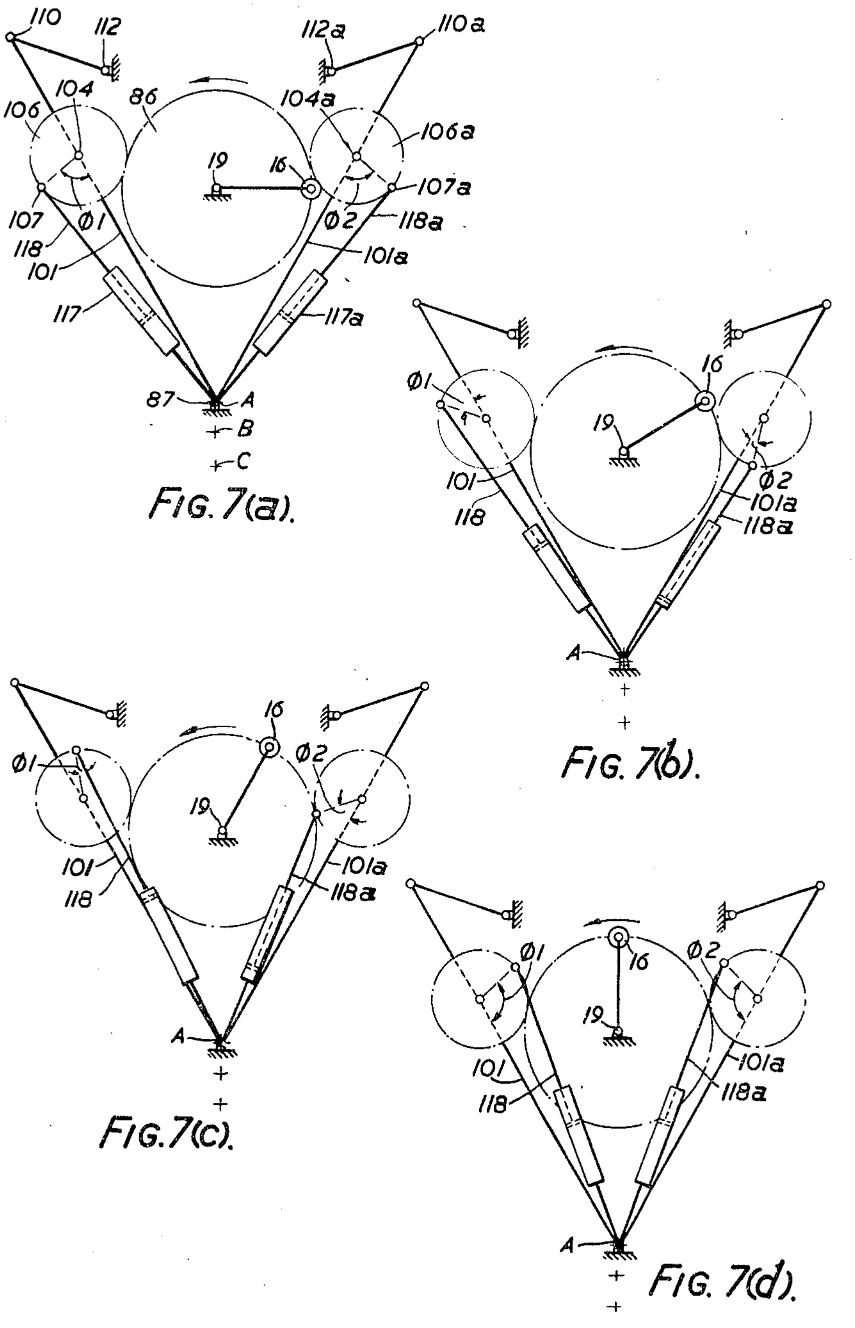

In order to obtain a lower value of maximum torque, the shaft 87 may be lowered from the position B of FIGURE 8 to the position A of FIGURE 7. FIGURE 7($a$) shows a symmetrical disposition similar to that of FIGURE 8, but the angles $\theta_1$ and $\theta_2$ are in this case both equal to 78°. FIGURES 7($b$), ($c$) and ($d$) correspond respectively to FIGURES 8($b$), ($c$) and ($d$), but with the new arrangement the maximum torque obtainable is smaller and the range throughout which the torque exerted upon the shaft 83 can vary is smaller.

FIGURE 9 shows another similar series of dispositions of the arrangement of FIGURE 6. In this case, the angles $\theta_1$ and $\theta_2$ are both zero in the symmetrical arrangement of FIGURE 9 where the thrusts exerted by the cylinders 117 and 117$a$ act directly towards the shafts carrying the toothed wheels 105 and 105$a$. The dispositions of these figures correspond to the maximum torque range obtainable from the arrangement of FIGURE 6, the shaft 87 being at the position C.

Referring to FIGURE 6, the shaft 87 can be moved vertically, so that its axis moved through a series of positions including A, B and C, by operation of the cylinders 90 and 90$a$, the linkage including the bifurcated members 98 and 98$a$ being designed to hold the shaft 87 steady in any required position.

A looper roller installation of the kind just described may form part of a control system of the kind described with reference to FIGURE 5.

Figure 11:
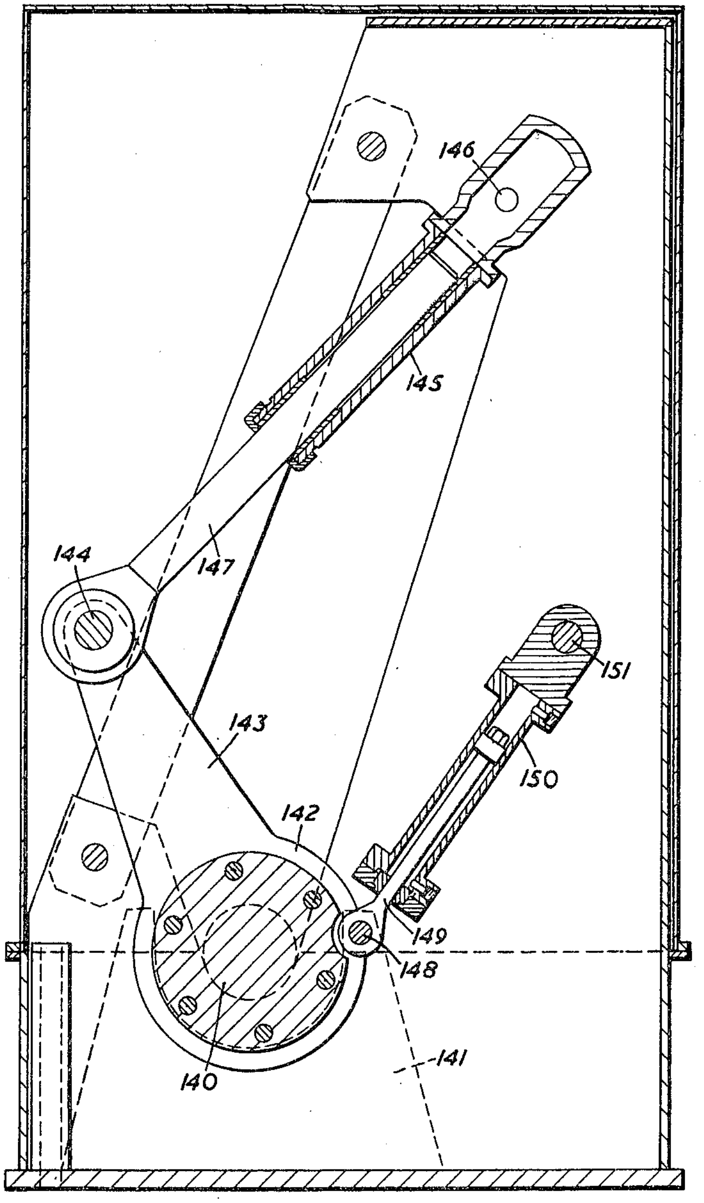
FIGURE 11 illustrates a still further looper according to the invention.

FIGURE 11 illustrates diagrammatically part of another looper arrangement which is similar in operation to that of FIGURE 3. FIGURE 11 is a view from the half coupling 21 of weigh-shaft 19 and shows an arrangement comprising a shaft 140 which may be coupled thereto by a half-coupling similar to 22 to apply torque to the weigh-shaft.

The shaft 140 is mounted in bearings one of which is indicated generally at 141, and has fixably connected around it a flange member 142. A crank arm 143 is formed integrally with member 142 and carries at its end a pivot pin 144.

A hydraulic or pneumatic cylinder 145 is pivotally connected at one end for rotation about a fixed axis 146 and the outer end of its ram 147 engages pivot pin 144 of crank arm 143. The flange member carries a further pivot pin 148, displaced circumferentially from the crank arm 143, and this pin engages the end of a ram 149 of a further hydraulic or pneumatic cylinder 150. This cylinder 150 is also connected for rotation about a fixed axis 151.

In this embodiment the cylinder 145 applies a torque to the shaft 140, and so to weigh-shaft 19 (not shown), which is arranged to vary with angular rotation of the shaft 140, corresponding to the looper arm position, in substantially similar manner to the earlier described embodiments. Thus, cylinder 145 is the main working cylinder which may be subject to a constant pressure to give rise to a substantially constant strip tension throughout the operational range of the looper.

During operation cylinder 150 is the strip weight balance cylinder, and it will be seen that with the looper arm in its inoperative low position and the cylinder 145, ram 147 and crank arm 143 axially aligned to effect zero torque on shaft 140, cylinder 150 may also be employed to raise the looper arm to a working position. For this reason cylinder 150 is shown to be a double-acting with fluid ports at both ends. Cylinder 150 may likewise be used to lower the looper arm.

Figure 12A:
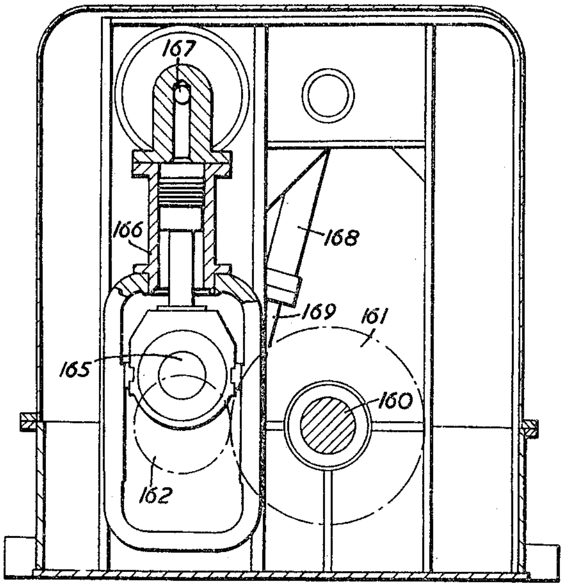
FIGURE 12 illustrates another form of looper.
Figure 12C:
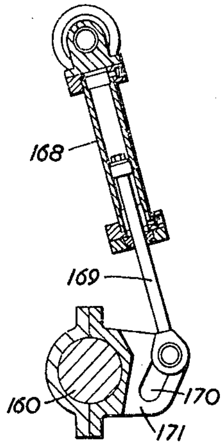
Figure 12B:
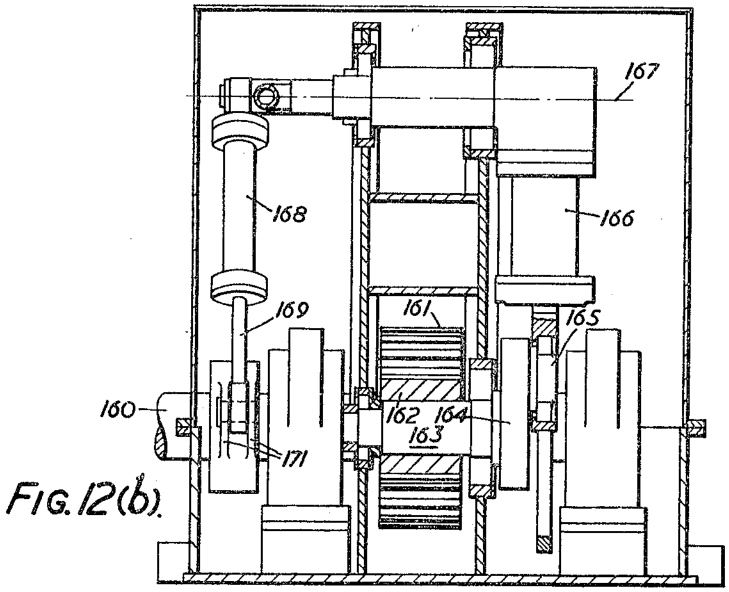

FIGURE 12 illustrates diagrammatically yet another embodiment of looper according to the invention and is in effect derived from a combination of FIGURES 3 and 11.

Again, as in FIGURE 11, the looper arm assembly and weigh-shaft are not shown and that part of the looper coupled to a drive shaft 160 is illustrated, which shaft 160 will normally be connected to the weigh-shaft 19 of the earlier figures by means of half-couplings 21 and 22, for example, to apply torque.

FIGURE 12 comprises three parts of which ($a$) is a cross-section, ($b$) is an end elevation, and ($c$) is a part cross-setcion.

In this embodiment the drive shaft 160 carries a toothed pinion 161 which meshes with a toothed wheel 162 mounted on a further shaft 163 axially parallel with drive shaft 160. This further shaft 163 also carries a crank arm 164 having a laterally extending pivot pin 165.

A hydraulic or pneumatic cylinder 166, pivotally connected at its end for rotation about a fixed axis 167, has the outer end of its ram engaged with the pivot pin 165 of crank arm 164. This cylinder is the main working cylinder and it will be seen that the arrangement of crank and pivoted cylinder is similar to that of FIGURE 11, but in this case instead of the drive shaft carrying the crank arm, an intermediate shaft 163 is employed which is coupled to the drive shaft by way of toothed wheel 162 and pinion 161, which is similar to the arrangement of FIGURE 3. Use of the composite arrangement of crank, and wheel and pinion, forms a gear system which increases the angular throw of the looper arm for a given operational stroke of the working cylinder, as compared to the arrangement of FIGURE 11, for example. Thus in a control system such as that of FIGURE 5 the looper can effect greater storage of strip whilst maintaining the strip tension substantially constant.

The balance cylinder 168 is pivoted about an axis parallel to axis 167 associated with cylinder 166 and its ram 169 is pivotally engaged in a slot 170 of a laterally extended flange member 171 connected to the drive shaft 160. This slot coupling is similar to that employed in connection with cylinder 131 of FIGURE 6 and cylinder 168 may be additionally employed to raise the looper arm to a working position. The cylinder 168 may also be employed to lower the looper arm from a working position and for this reason is shown to be double-acting in the same way as cylinder 150 of FIGURE 11.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. A looper for determining the tension of elongate material moving under tension between two rolling stations comprising a first shaft for disposition below said material and rotatable about a first axis parallel to the roll axes of said stations, a roller support arm fixably mounted on said first shaft for rotation therewith, a roller rotatably supported by said arm for engaging said material to vary the path thereof, a second shaft rotatable about a second axis and drivably connected to said first shaft, a toothed member fixably mounted on said second shaft for rotation therewith, a third shaft rotatable about a third axis parallel to said second axis, a toothed wheel supported on said third shaft to engage said member, a first crank member drivably connected to said wheel and rotatable about said thrid axis with said wheel, a first piston-and-cylinder assembly having a piston rod extendible relative to a fixed reference, and a first connecting rod pivotally connected at one end to said first crank member, drivably connected to said piston rod at its other end, and rotatable about a fourth axis parallel to said second axis.

2. A looper according to claim 1 wherein said first crank member is a first crank arm fixably mounted on said third shaft for rotation therewith, the cylinder of said first assembly is pivotally connected for rotation about said fourth axis, and said first connecting rod is a rigidly connected extension to the piston rod of said first assembly.

3. A looper according to claim 2 comprising a second crank arm fixably mounted on said second shaft for rotation therewith, a second piston-and-cylinder assembly having its cylinder pivotally connected for rotation about a fifth axis parallel to said second axis and an extendible piston rod pivotally coupled at its outer end to said second crank arm.

4. A looper according to claim 2 wherein the piston rod of said second assembly is coupled to said second crank member by a pin-and-slot coupling.

5. A looper for determining the tension of elongate material moving under tension between two rolling stations comprising a first shaft for disposition below said material and rotatable about a first axis parallel to the roll axes of said stations, a roller support arm fixably mounted on said first shaft for rotation therewith, a roller rotatably supported by said arm for engaging said material to vary the path thereof, a second shaft rotatable about a second axis and drivably connected to said first shaft for rotation therewith, a first toothed wheel fixably mounted on said second shaft for rotation therewith, two third shafts rotatable about individual third axes parallel to and spaced on opposite sides of said second axis, individual second toothed wheels supported on said third shafts to engage said first wheel at different points, individual crank members drivably connected to said second wheels for rotation therewith about said third axis, and individual first piston-and-cylinder assemblies having cylinders pivotally connected to a fourth shaft disposed along an axis parallel to said second axis and piston rods pivotally connected to said crank members.

6. A looper according to claim 5 comprising a crank arm fixably mounted on said second shaft for rotation therewith, and a further piston-and-cylinder assembly having a cylinder pivotally connected to a fixed frame for rotation about an axis parallel to said second axis and a piston rod pivotally coupled at its outer end to said crank arm.

7. A looper according to claim 6 wherein the pivotal coupling between the piston rod of said second assembly and said crank arm is of pin-and-slot form.

8. A looper according to claim 5 comprising individual arms to support said third shafts pivotally supported at one end by said fourth shaft and pivotally coupled to a fixed frame at their other ends by individual toggle arms.

9. A looper according to claim 5 comprising a lever arm fixably mounted on said second shaft for rotation therewith, and at lesat one second piston-and-cylinder assembly having a cylinder pivotally connected to a fixed frame for rotation about an axis parallel to said second axis and a piston rod to urge rotation of said lever arm in one sense, and at least one third piston-and-cylinder assembly having a cylinder pivotally connected to said fixed frame for rotation about an axis parallel to said second axis and a piston rod to urge rotation of said lever arm in the opposite sense.

10. A looper according to claim 5 comprising at least one further piston-and-cylinder assembly having a cylinder connected to a fixed frame for rotation about an axis parallel to said second axis and a piston rod coupled to said fourth shaft to adjust the disposition of such shaft.

11. A looper according to claim 10 wherein each of said further assemblies has its cylinder pivotally connected to said frame for rotation about a common axis, and its piston rod pivotally connected to said fourth shaft, and comprising members connected with and extending in opposite directions normally from said fourth shaft, individual fifth shafts disposed paralel to said fourth shafts on opposite sides thereof, and individual further arms at least one pivotally connected between one fifth shaft and an arm extending from said fourth shaft in one direction, and at least one pivotally connected to the other fifth shaft and an arm extending from said fourth shaft in the opposite direction.

12. A looper comprising a roller adapted to engage elongate material moving under tension; a support arm to support the roller and to transmit force thereto to vary the path of the material; said roller and support arm being rotatable about a first reference axis, the ratio of the tension in said material to the torque applied to the support arm varying with the angle which the support arm makes with the material; a force producer adapted to produce a preselected constant force; and a self-adjusting mechanical linkage system connecting the support arm and force producer and arranged to transmit force from the force producer to apply a torque to the support arm, the torque exerted by the force producer on the linkage system being zero when the roller is in its lowest position, and means for raising said roller from its lowest position, which system includes a first toothed member connected to the support arm and rotatable about a second reference axis parallel to the first reference axis and a toothed crank wheel drivably engaging said first toothed member, rotatable about a third reference axis parallel to the first referenced axis; a connecting rod pivotally coupled at one end to said crank wheel and its other end coupled to said force producer and rotatable about a fourth reference axis parallel to said first axis and additional to that of its pivotal coupling; the mechanical linkage system being so dimensioned and arranged that the ratio of the force supplied by the force producer to the torque applied to support arm varies substantially in the same manner, with variation of the angle of the support arm, as the first-mentioned ratio, whereby the tension in the material will be maintained substantially constant.

13. A looper comprising a roller adapted to engage elongate material moving under tension; a support arm to support the roller and to transmit force thereto to vary the path of the material; said roller and support arm being rotatable about a first reference axis, the ratio of the tension in said material to the torque applied to the support arm varying with the angle which the support arm makes with the material; a force producer adapted to produce a preselected constant force; and a self-adjusting mechanical linkage system connecting the support arm and force producer and arranged to transmit force from the force producer to apply a torque to the support arm, the torque exerted by the force producer on the linkage system being zero when the roller is in its lowest position, which system includes a first toothed member connected to the support arm and rotatable about a second referenced axis parallel to the first reference axis and a further toothed member drivably engaging said first toothed member, rotatable about a third reference axis parallel to the first reference axis; and operatively connected with the force producer for rotation thereby; the mechanical linkage system being so dimensioned and arranged that the ratio of the force supplied by the force producer to the torque applied to the support arm varies substantially in the same manner, with variation of the angle of the support arm, as the first-mentioned ratio, whereby the tension in the material will be maintained substantially constant; and a further force producer for applying force through said linkage system to said support arm to balance the weight of said material.

References Cited by the Examiner

UNITED STATES PATENTS

| | | | |
|---|---|---|---|
| 1,854,198 | 4/32 | Jones et al. | 80—35 |
| 1,866,232 | 7/32 | Sykes | 80—35 |
| 2,189,609 | 2/40 | Lessman | 80—35.1 |
| 2,192,044 | 2/40 | Lessman | 80—35 |
| 2,215,329 | 9/40 | Lessman | 80—35.1 |
| 2,323,818 | 7/43 | Lessman | 80—35.1 |

FOREIGN PATENTS

| | | |
|---|---|---|
| 214,663 | 11/57 | Australia. |
| 590,858 | 7/47 | Great Britain. |

WILLIAM J. STEPHENSON, *Primary Examiner.*

THOMAS E. BEALL, NEDWIN BERGER, *Examiners.*